United States Patent [19]

ImBrogno

[11] Patent Number: 4,829,701
[45] Date of Patent: May 16, 1989

[54] BIRD CAGE TRAP

[76] Inventor: J. A. ImBrogno, 22 Westmoreland Dr., Monessen, Pa. 15062

[21] Appl. No.: 230,453

[22] Filed: Aug. 10, 1988

[51] Int. Cl.[4] .............................................. A01K 69/10
[52] U.S. Cl. ............................................ 43/61; 43/67
[58] Field of Search .................. 43/58, 64, 60, 61, 62, 43/63, 64, 65, 66, 67, 68, 69, 70, 71, 72, 73, 74, 75, 76, 77

[56] References Cited

U.S. PATENT DOCUMENTS

| 826,942 | 7/1906 | Kellog | 43/64 |
| 1,243,008 | 10/1917 | Taylor | 43/61 |
| 1,245,138 | 10/1917 | Zarling | 43/76 |
| 2,447,147 | 8/1948 | Warner | 43/61 |
| 2,478,605 | 8/1949 | Symens | 43/61 |
| 2,736,984 | 3/1956 | Deane | 43/61 |
| 3,778,922 | 12/1973 | Clark | 43/61 |
| 4,779,373 | 10/1988 | Krenson | 43/61 |

Primary Examiner—M. Jordan
Attorney, Agent, or Firm—William J. Ruano

[57] ABSTRACT

A bird cage and trap wherein a bird, upon entering cage, steps upon a pivotal grate which is attached to a triggering means which is, in turn, supporting open a trap door. Weight of bird causes the grate to pivot and triggers the trap door. The trap door can also be locked open using the same triggering means positioned in a slightly different manner.

8 Claims, 3 Drawing Sheets

BIRD CAGE TRAP

BACKGROUND OF THE INVENTION

Self trapping animal cages are presently in use to trap a variety of animals. These traps often have several different operational means designed to accomplish specific tasks such as springing the trap or locking of the door. Such a variety of mechanisms makes the traps complicated to use and more costly to produce. In addition, it is often difficult to see from a distance if a trap has been sprung.

SUMMARY OF THE INVENTION

A bird cage trap wherein a single means is used to either spring the trap door or lock the trapdoor in an open position. The bird cage trap comprises a wire cage with a vertically sliding door which very simply interacts with a triggering or locking means. The base of the trap door can be at ground level to trap a bird walking on the ground or the trap door can be positioned higher in the trap with the use of a perch. In addition, the door has an indicia to allow the position of the door to be visible from a distance.

DESCRIPTION OF THE PREFERRED EMBODIMENTS

Figure 1:
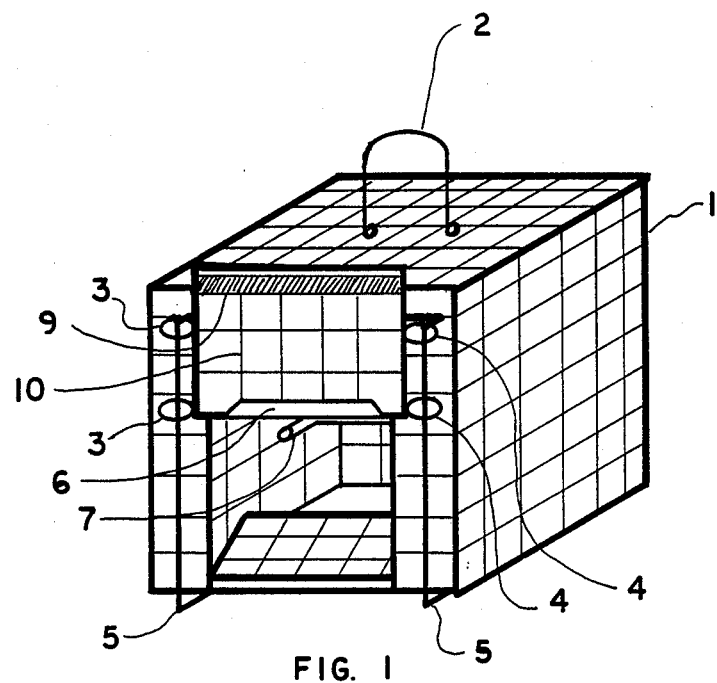
FIG. 1 is a perspective view of the bird cage trap showing the trap door open and in a set position.
Figures 2, 3, 4:
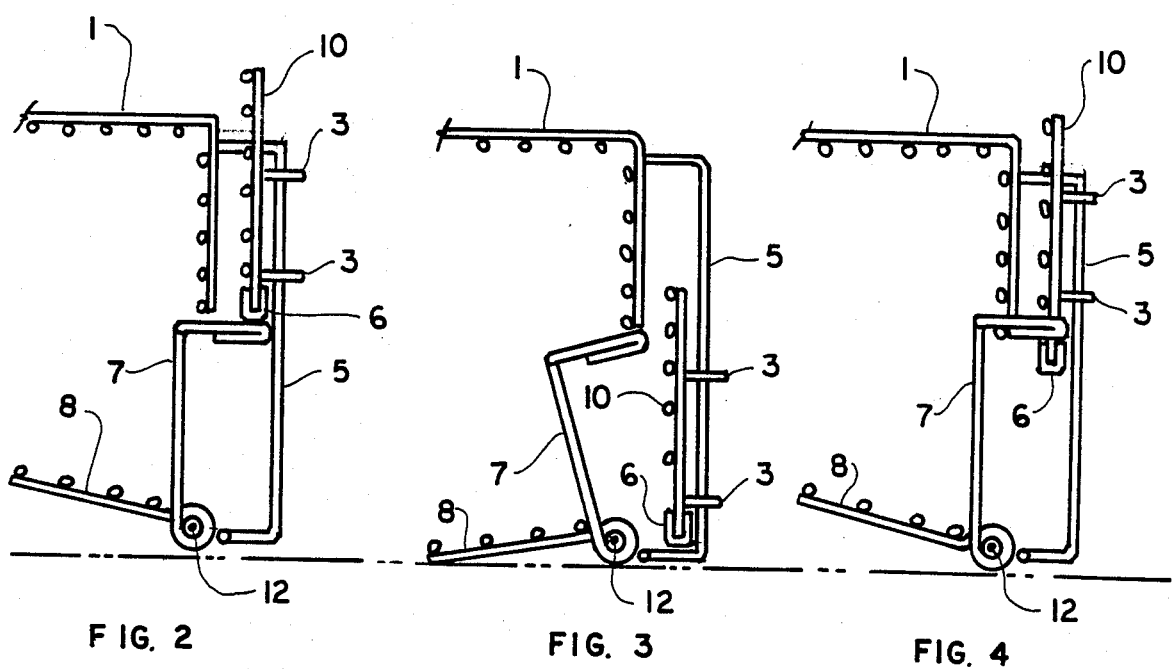
FIG. 2 is a cross-sectional view taken from the left side along line 2—2 of FIG. 1.
FIG. 3 is a cross sectional taken from the left side along line 2—2 of FIG. 1 after the trap door has been sprung.
FIG. 4 is a cross-sectional view taken from the left side of FIG. 1 along line 2—2 showing the trap door in a locked open position.

Referring more particularly to FIGS. 1-3, numeral 1 denotes a wire bird cage having a vertically slideable door 10 in the form of a wire grid to which is rigidly attached two pairs of spaced eyelets 3,3 and 4,4. Each pair of eyelets 3,3 and 4,4 encircle one of two vertical guide rods 5 and 5 which are rigidly attached to the front face of cage 1 so that door 10 can slide vertically from a closed to an open position.

Door 10 also has an indicia 9, such as a colored strip, running along its top end for allowing the position of the door to be clearly visible from a distance. In addition, door 10 has a smooth metal U-shaped guard plate running along its bottom edge to protect the bird should the bird be trapped under the door.

Referring more particularly to FIG. 2, it shows the bird cage trap in an open and set position wherein door 10 is being supported in an open position by trigger/locking rod 7 which is pivotally mounted and which is of inverted L shaped wire with a short portion extending outwardly from the extremity of the L at right angles toward the front of the cage so as to be selectively fitted under door guard 6 when the door is open in order to set the trap door.

Trigger/locking rod 7 is pivotally mounted to tie rod 12 which extends horizontally near the bottom front of the cage and which is rigidly attached to sides of cage 1. Rigidly attached to said rod 7 is a rectangular entrance grate 8 positioned at the lower, inner threshold of the cage so as to be stepped on by any bird that may enter the cage. The weight of the bird will force entry grate 8 to pivot downwardly causing trigger/locking rod 7 to pivot towards the back of cage 1 so as to cause withdrawal of its short extending portion from its supporting position under door guard 6, allowing door 10 to drop into the closed position as illustrated in FIG. 3

Referring to FIG. 4, it shows trigger/locking rod 7 positioned so as to lock door 10 in an open position. The short outwardly extending portion of said rod 7 terminates in a tightly spaced, U-shaped configuration so that the very end of trigger/locking rod 7 can be butted against a horizontal front portion wire of cage 1. By placing the short portion of said rod 7 over a horizontal front cage wire, also above gate guard 6, a locking open of door 10 will result because the terminal end of said rod 7 will butt against said horizontal cage wire, thus preventing said rod 7 from pivoting, regardless of whether a bird steps on entry grate 8.

Figure 5:
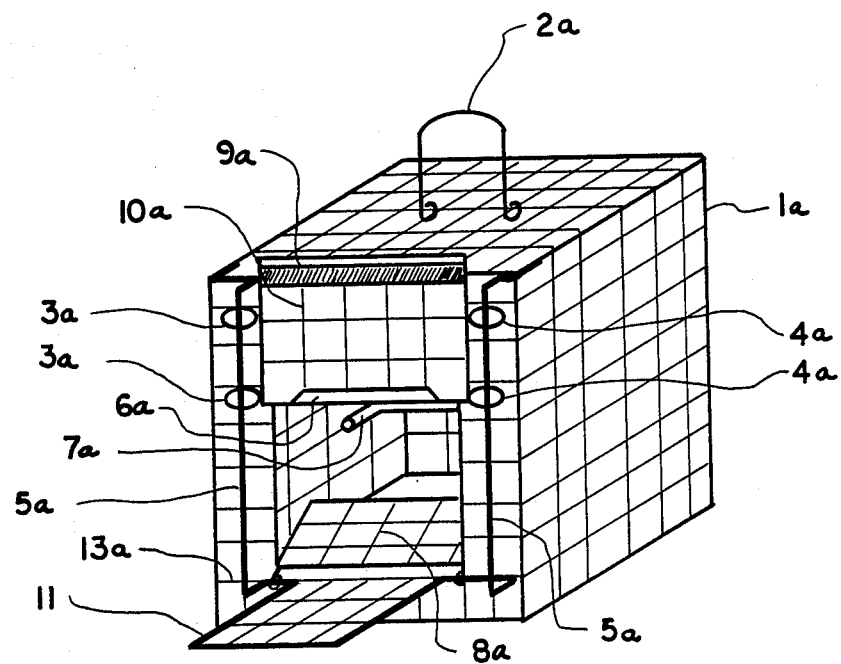
FIG. 5 is a perspective view of a modification using a perch entry to the trap.
Figure 6:
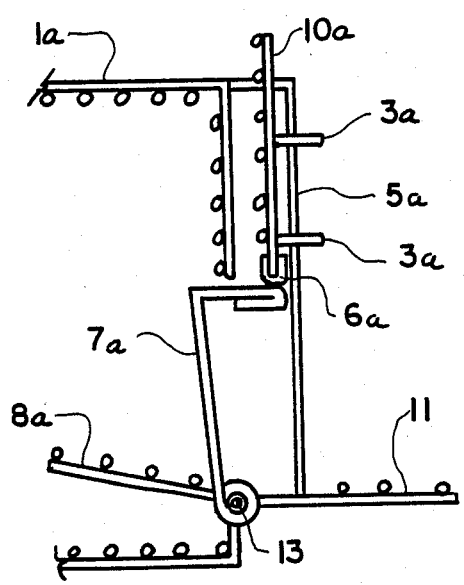
FIG. 6 is a cross-sectional view taken from the left side of FIG. 5 along line 6—6 and showing the door in an open and set position.
Figure 7:
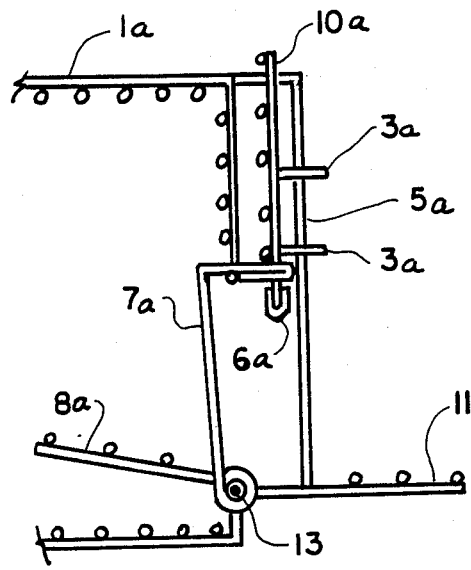
FIG. 7 is a cross-sectional view taken from the left side of FIG. 5 along line 6—6 showing the door in a locked open position.
Figure 10:
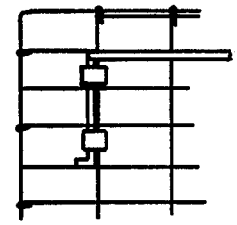
FIG. 10 is an enlarged fragmentary view of FIG. 9.

FIGS. 5-7 show a modification of the bird cage trap wherein the entrance to cage 1a is elevated from the ground and a perch 11 is rigidly attached to said cage, providing the bird a landing point for above-ground entry to said cage. In this modification, trigger/locking rod 7a is pivotally mounted directly to horizontal front wire 13 of cage 1a so as to eliminate the need for tie rod 12 shown in FIGS. 2-4.

Figure 8:
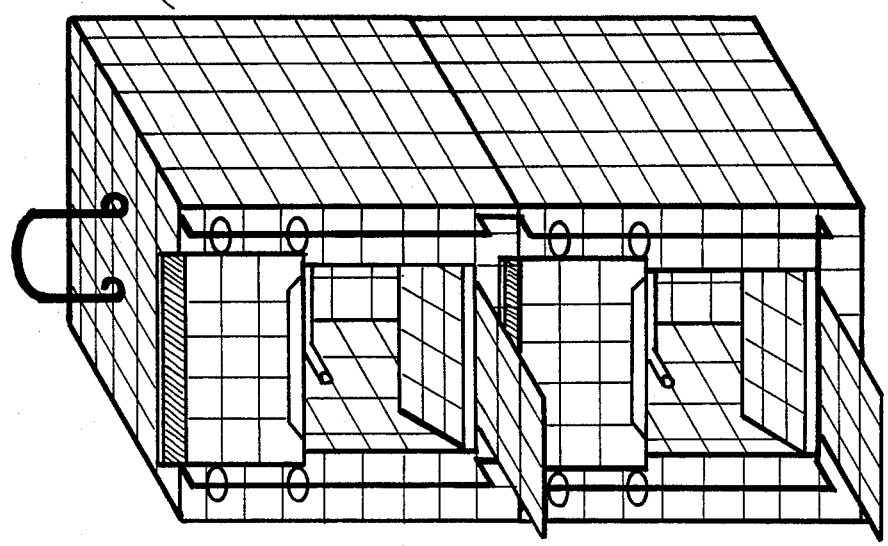
FIG. 8 is an elevational view of a pair of stacked and interconnected bird cage traps.

FIG. 8 shows an assembly comprising a pair of stacked bird cage traps of the construction shown in FIG. 5 generally denoted by numeral 15 and embodying a modification of the present invention. They may also be of the construction shown in FIG. 1.

Figure 9:
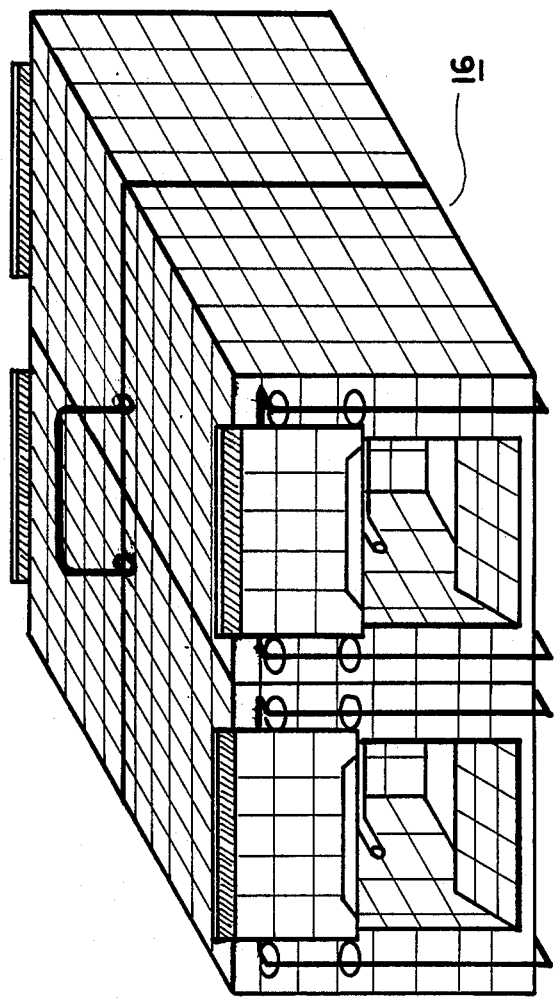
FIG. 9 is an elevational view showing four laterally connected bird cage traps.

FIG. 9 shows an assembly comprising four bird cage traps of the construction shown in FIG. 1 embodying the present invention and generally denoted by numeral 16. The cages may also be of the construction shown in FIG. 5.

Thus is will be seen that I have provided a novel bird cage trap which operates simply and uses a single means to selectively trigger or lock the trap door. It should also be noted that I have also provided an easily noticeable and visual indicia which maybe clearly seen from a distance, indicating the position of the trap door.

While I have illustrated and described two embodiments of my invention, it will be understood that they are by way of illustration only and that other modifications are contemplated in my invention within the scope of the following claims:

I claim:

1. A bird cage trap, comprising a grid shaped wire cage having an opening at the front thereof, exteriorly atached wire guide means extending vertically along the sides of said opening, a door vertically slideable by said guide means from the open to the closed position, an entry grate pivotally mounted on the bottom of said cage adjacent said opening, and trigger/ locking means integrally extending upwardly from said entry grate for selectively engaging the bottom of said door for trapping or locking said door to a front portion of said cage into the open position.

2. A bird cage trap as recited in claim 1 wherein said entry grate is pivotally mounted in vertical spaced relationship from the bottom of said cage, and a perch grate rigidly connected to the front portion of said grate in close relationship to said grate.

3. A bird cage trap as recited in claim 1 wherein said guide means comprises two pair of spaced wire eyelets, each pair being rigidly attached on opposing sides of said door so as to allow said door to slide vertically from an open to a closed position.

4. A bird cage trap as recited in claim 1 including an indicia in the form of a brightly colored flexible plastic strip running horizontally along the top edge of said door, said indicia being woven between vertical wire members of said door.

5. A bird cage trap as recited in claim 1 including a protective guard of a smooth U shaped piece of metal fitted over and running the length of bottom edge of said door, said guard serving to protect a bird from injury should it be trapped under said door.

6. A bird cage trap as recited in claim 1 wherein said trigger/locking means comprises a pivotally mounted, inverted L shaped rod having a short foward extending portion thereof extending at a right angle from the extremity of said inverted L shaped rod, a rigidly attached rectangular entry grate positioned so as to be immediately stepped upon by a bird entering said cage.

7. A bird cage trap assembly comprising a pair of cages of the construction recited in claim 1 arranged in vertically stacked relationship.

8. A bird cage trap assembly comprising a plurality of cages of the construction recited in claim 1 in close side-by-side relationship.

* * * * *